United States Patent
Jorgenson et al.

[15] 3,654,484
[45] Apr. 4, 1972

[54] CONTROL APPARATUS

[72] Inventors: Harry E. Jorgenson; Wayne W. Hansen, both of Minneapolis, Minn.

[73] Assignee: Onan Corporation

[22] Filed: Aug. 21, 1970

[21] Appl. No.: 65,764

[52] U.S. Cl. ............................................307/149, 317/108
[51] Int. Cl. ..............................................................H02j 1/00
[58] Field of Search ..........................317/105, 107, 108, 109; 307/64, 149, 150, 112

[56] References Cited

UNITED STATES PATENTS

| | | | |
|---|---|---|---|
| 2,606,232 | 8/1952 | St. John | 317/108 |
| 3,496,376 | 2/1970 | Jones | 307/64 |

Primary Examiner—Herman J. Hohauser
Attorney—Carlsen, Carlsen & Sturm

[57] ABSTRACT

A system and apparatus for selectively connecting one of a plurality of sources of electrical power to a load. Apparatus is furnished to be plugged in intermediate an electrical watt hour meter and the meter receptacle normally provided in a typical electrical power utilization system that is usually designed to handle a single primary source of power. The apparatus provides for selective connection of the load distribution center to the utility power line or to another source of power which might reasonably be termed an auxiliary power source. The apparatus may easily be made to be tamper proof by the inclusion of appropriate locking seals.

Further provision is made for manual switching or fully automatic operation including the energization of an auxiliary source of power and connection of the auxiliary source to the input terminals of the load distribution center. Suitable devices for sensing the existence of voltage are included to provide signals indicative of a need for selectively switching the input terminals of the load distribution center between one source of power or another.

10 Claims, 4 Drawing Figures

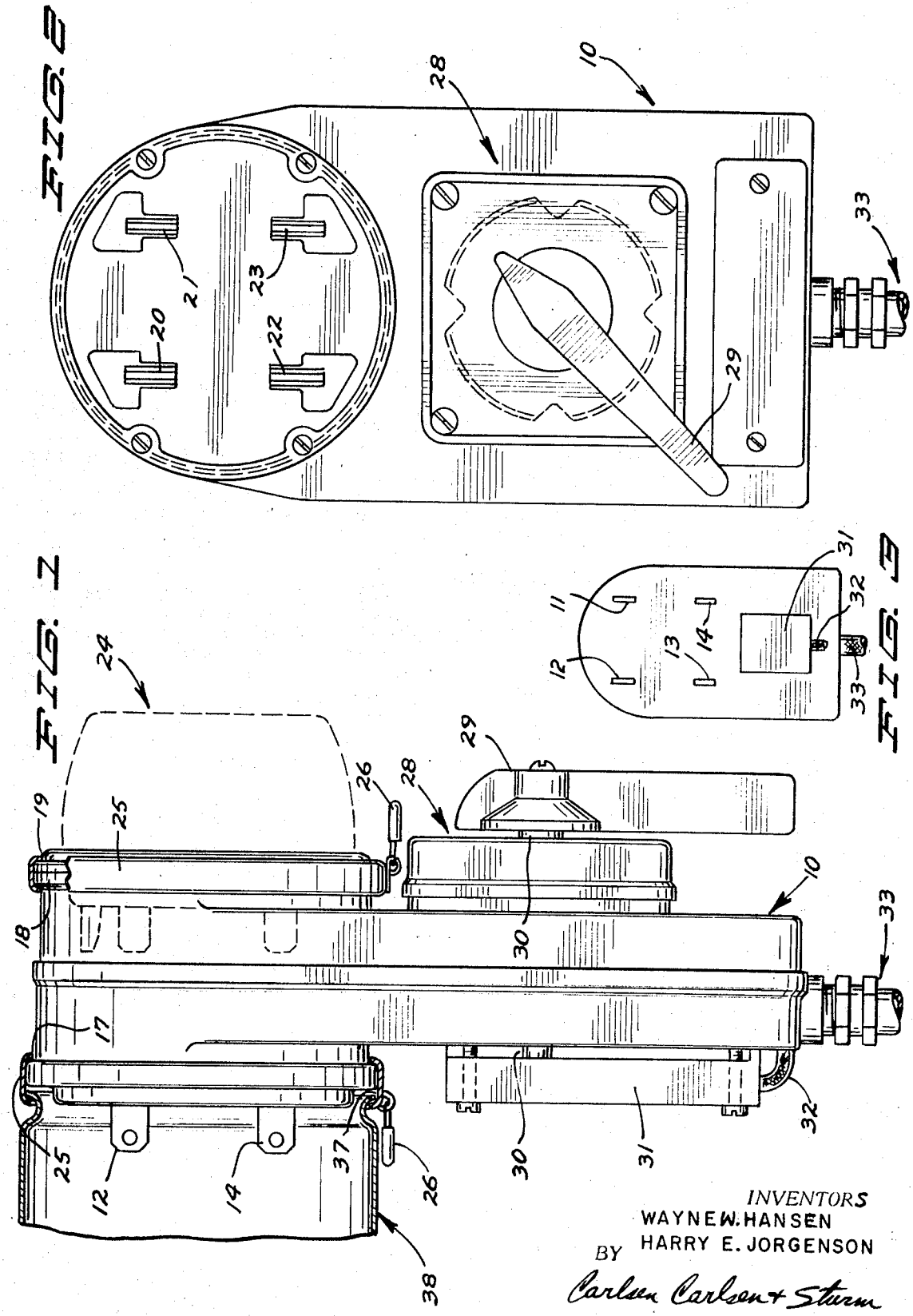

3,654,484

CONTROL APPARATUS

SUMMARY OF THE INVENTION

Briefly, our invention embodies apparatus which is operable to transfer electrical load between one or more of a plurality of sources of electrical energy, only one of which is normally energized, while the others may be selectively energized upon failure of a primary source of power.

In a typical present day installation, a power distribution system containing a plug-in meter for measuring watt hours delivered from a power line, to which it is connected, to the loads connected to the output terminals of the distribution system. An example of such an application may be found in a typical domestic installation in which a meter box is used to provide a receptacle for the meter and disconnect means from a load distribution center which is used to provide a plurality of appropriate terminals and de-energize or the like to divide electrical power from a primary source into a number of individual branch circuits to which individual loads are or may then be connected. The meter is generally plugged in and sealingly connected to the meter box so as to prevent unauthorized tampering therewith.

Recently, there has been an increasing number of failures of the primary source of power to which such a typical apparatus is connected. For this reason, many individuals and organizations have found it necessary or desirable to maintain one or more sources of auxiliary or standby power, such as gasoline or diesel driven electrical energy generating sets of the general type now offered for sale by a number of companies, including the assignee of the present invention.

Such auxiliary apparatus may range from simple hand-cranked apparatus to highly sophisticated self-starting apparatus and systems in which failure of a primary or other auxiliary source of power will result in automatic energization of a particular source of power whereby very little, if any, interruption need occur in the overall power requirements of a given installation or load distribution center.

We have provided apparatus which may be economically installed to be disposed intermediate a meter receptacle and a meter in a power utilization system which may further be connected to one or more sources of auxiliary power and which contains suitable switching means for selectively connecting the load distribution center to distribute electrical energy from whichever of the primary or auxiliary sources of electrical energy happens to be reliably energized.

Our invention is further directed to a system of this type which will be automatically operable to perform the function of selectively connecting the output terminals of the load distribution center to the then energized source of electrical power.

Normally, preference would be given to a primary source of electrical power such as that normally provided by electrical utility power companies, however, it may be desirable to operate in other modes of operation, with preference given to preferred sources of electrical energy. In fact, it is conceivable that each of the sources of electrical energy may be of the same type or have the same status so that no particular preference would be given except to insure that there would be a substantially uninterrupted supply of electrical energy at the output terminals of the load distribution center.

DESCRIPTION OF THE DRAWINGS

FIG. 1 is a side elevational view of a preferred embodiment of our invention shown disposed in solid outline between a fragmentary sectional portion of a load distribution center and including a representation of an electrical power meter shown in phantom dotted outline;

FIG. 2 is a front elevational view of the apparatus shown in FIG. 1 with the phantom view of the meter and load distribution center omitted;

FIG. 3 is a fragmentary view of the left side of FIG. 1 from which certain details have been omitted for the sake of clarity;

Figure 4:
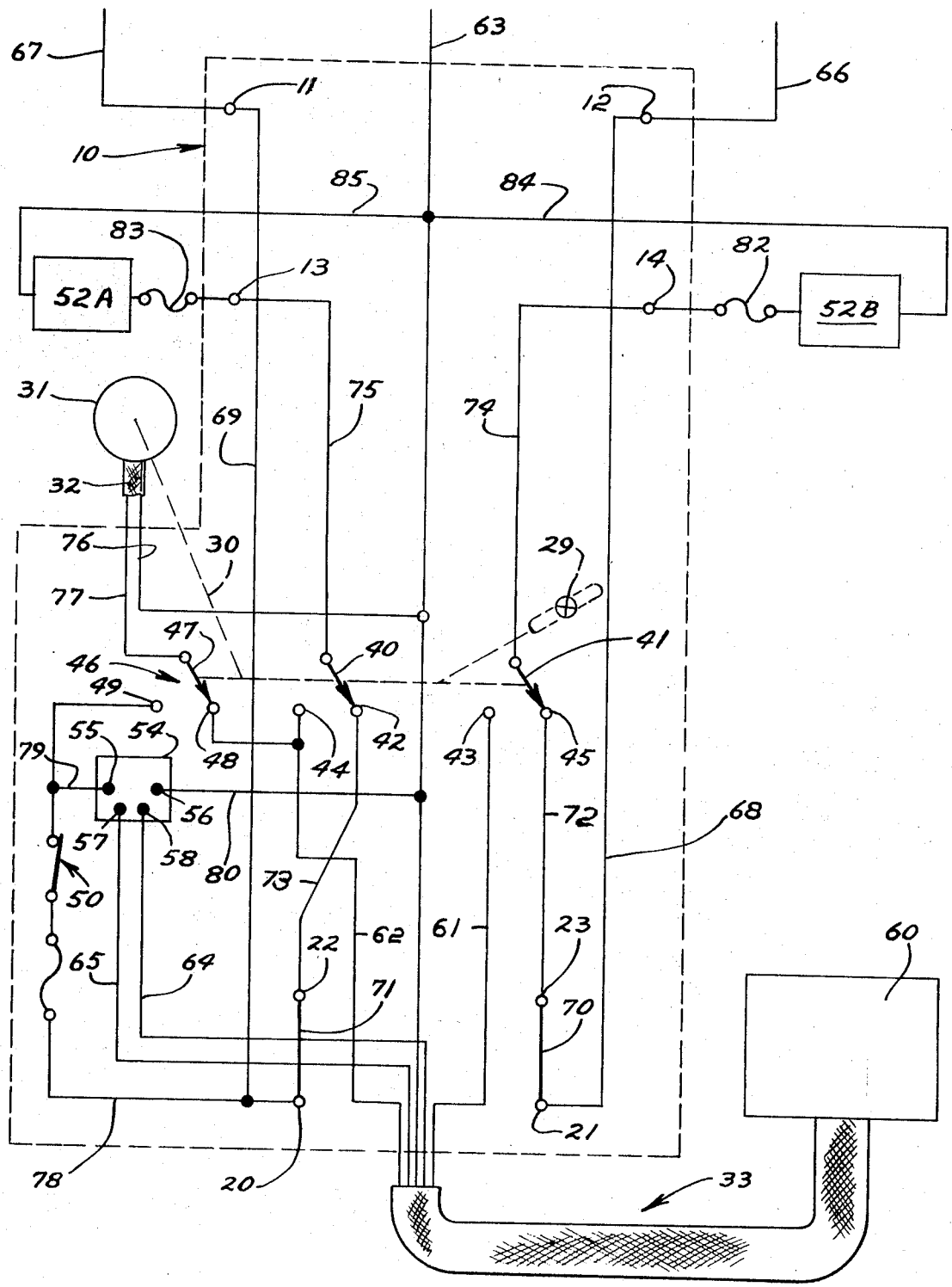
FIG. 4 is an electrical schematic and diagrammatic drawing of a representative control circuitry that may be embodied in our invention as illustrated.

Referring to the several figures of the drawings in which like elements have been identified by like reference characters, there is shown an apparatus housing, indicated generally as transfer housing 10, which includes a switch 28 having an operating shaft 30 extending therethrough disposed generally at one end of transfer housing 10, and a plurality of terminals disposed in substantial axial alignment at the other top end thereof. Surrounding and adjacent the front and back faces of the terminals at the top end of transfer housing 10, are raised outwardly radially extending rim portions 17 and 18 for purposes to be described below.

The inwardly facing upper end of transfer housing 10 is provided with a pair of input terminals 11 and 12 and a pair of output terminals 13 and 14 which are adapted to be connected to suitable corresponding complimentary disposed receptacles provided in the load distribution housing 38 as shown in fragmentary section.

Transfer housing 10 also includes a corresponding plurality of meter receiving terminals 20, 21 and 22 and 23 at its front face and adjacent rim portion 18. A meter 24 is shown in phantom outline as including a rim portion adapted to lie adjacent portion 18 on housing 10 when a meter is disposed with its complimentary disposed terminals in conductive engagement with terminals 21, 22 and 23 on the front face of transfer housing 10. When in such disposition, a locking rim 25 having a locking device attached thereto may be used to securely hold and retain meter 24 in position. In a similar manner, another locking rim 25, having a locking device 26, is shown disposed over rim 17 on transfer switch 10 and rim 37 on load distribution housing 38 to securely retain transfer housing 10 in operative disposition thereon.

Transfer housing 10 is shown as including a double pole double throw switching means indicated generally by reference character 28. Switching means 28 includes a shaft 30 that may be operated by a manual handle 29 disposed at the front of transfer housing 10 or by a motor drive means 31 that may be suitably connected to shaft 30 and mounted upon the rear face of transfer housing 10. Motor drive 31 is shown connected to the interior of transfer housing 10 through suitable cable means indicated by reference character 32. Transfer housing 10 also includes at least one connector at its lower end that may be removably connected to a further cable-conduit 33 for purposes to be explained below.

In connection with carrying out the principles of our invention, we have thus provided a connector in the form of transfer housing 10 which may be removably and sealably disposed intermediate a load distribution center and a meter in a typical load distribution center in homes, factories or the like.

Referring now to FIG. 4 in the drawings, many of the elements described above in connection with the physical embodiment illustrated in FIGS. 1, 2 and 3 are shown incorporated in a complete electrical schematic and diagrammatic drawing of a control system which may be operable in accordance with the principles of our invention.

In FIG. 4, the terminals to be connected to the load distribution center 38 are shown at the upper part of the drawing and the terminals to be connected to the electrical power meter 24 are shown at the lower portion of the drawing. In other respects, the parts may be seen to be in the general disposition as shown on FIGS. 1, 2 and 3 of the drawing and because of this general similarity, transfer housing 10 is shown in dotted outline for the convenience of the reader.

In addition, an auxiliary source of electrical energy has been indicated in block diagrammatic form by reference character 60. Such apparatus may conveniently comprise an internal combustion engine driven generator wherein the internal combustion engine is started in response to a suitable signal which may be supplied manually or may be supplied from another source of signal but, which, in any event, will reliably and repeatedly serve to start and continue energization and continual running of the source if auxiliary power until it is desired to intentionally de-energize the same.

In FIG. 4, input terminals 11 and 12 are shown connected to the source of electrical energy through conductors 66 and 67 which, together with conductor 63, comprise a three wire single phase source of electrical energy which is to be distributed in accordance with a predetermined arrangement. In the equipment shown in FIG. 4, input terminals 11 and 12 are connected to output terminals 13 and 14 through conductors 69 and 68, terminals 20 and 21 on meter 24, conductors 71 and 70, terminals 22 and 23 on meter 24, conductors 73 and 72 connected to stationary contacts 42 and 45 on switch 28, movable contacts 40 and 41 on switch 28 and conductors 75 and 74 respectively. A load means 52A as shown connected between terminal 13 and neutral conductor 63 through conductors 83 and 85 and a further load means 52B is shown connected intermediate output terminal 14 and neutral conductor 63 through conductors 82 and 84.

It should be noted that in the embodiment illustrated in FIG. 4, conductors 70 and 71 illustrate jumper conductors that might be used in place of a meter, such as meter 24, or may be considered to represent the function of the meter with respect to the flow of electrical energy from input terminals 10 and 11 to output terminals 13 and 14.

In the illustrative embodiment of FIG. 4, double pole double throw switch 28 is illustrated as having a pair of movable contacts 40 and 41 each of which has associated stationary contacts 42 and 44 and 43 and 45, respectively. Each of the two contact assemblies are shown driveably connected through driving means 30 that is also connected to manual drive handle 29 and to the output of motor drive 31.

Driving means 30 is also connected to a further single pole double throw switching means 46 having a movable contact 47 and stationary contacts 48 and 49. Movable contact 47 is connected to motor drive 31 through conductor 77 and cable 32 and motor drive 31 is also connected to neutral conductor 63 through cable 32 and conductor 76. Stationary contact 48 is connected to stationary contact 44 on switch 28 which is in turn adapted to be energized from source of auxiliary energy 60 through cable 33 and conductor 62. Stationary contact 49 is connected to input terminal 11 through normally closed switch 50, conductor 78 and conductor 79.

Referring further to FIG. 4 of the drawings, at the lower left hand side of the schematic and diagrammatic representation of a preferred controlled circuit, a block diagrammatic form of a sensing means 54 is shown having a pair of input terminals 55 and 56 and a pair of output terminals 57 and 58. Terminal 56 is connected to conductor 63 through conductor 80 and terminal 55 is connected to conductor 78 through conductor 79. Output terminal 58 is connected to auxiliary power generating apparatus 60 through conductor 64 and output terminal 57 is likewise connected to auxiliary power generating apparatus 60 through conductor 65. In the embodiment shown, sensing means 54 is adapted to respond to the absence of a potential existing intermediate neutral conductor 63 and input, primary power source conductor 69. The absence of such potential serves to provide an indication, as might be supplied by an indicator lamp or annunciator for visual indication or, as in the illustrative preferred embodiment, by the actuation of an appropriate switching means intermediate output terminals 57 and 58 (not shown) which may serve to complete a further circuit (not shown) to cause energization of auxiliary power generating apparatus 60. Hence, the absence of the desired predetermined electrical energy on the source of primary power connected to conductors 63, 66 and 67 will serve to energize auxiliary power generating apparatus 60. It may be appreciated that the previously indicated indication or annunciation of the lack of primary power may also alert a human operator to actuate switching means 46 and to energize auxiliary power generating apparatus 60.

However, proceeding with the automatic operation under consideration, the energization and resultant signal output appearing at conductors 64 and 65 of sensing means 54, will serve to cause auxiliary power generating apparatus 60 to become energized by virtue of the connection through cable 33. The resultant energization of auxiliary power generating apparatus 60 serves to provide electrical energy at conductors 61 and 62 in turn serves to energize motor drive 31 through conductor 62, stationary contact 48 on switching means 46, conductor 77 and conductor 76 connected to neutral conductor 63.

Motor drive 31 may then be operative through driving means 30 to cause a reversal of the illustrated contact state on the single pole double throw switching contact illustrated near the center portion of FIG. 4 with the result that movable contact 41 will then be connected to stationary contact 43, movable contact 40 will then be connected to stationary contact 44 and movable contact 47 will then be connected to stationary contact 49.

In this condition of operation, motor drive 31 will be energized from neutral conductor 63, through conductor 76, cable 32, conductor 77, movable contact 47, stationary contact 49 and conductor 78 connected to input terminal 11 through conductor 69. Simultaneously, output terminal 13 will be connected to output conductor 62 connected to auxiliary power generating apparatus 60 through cable 33 through conductor 75, movable contact 40, stationary contact 44 and conductor 62. In a similar manner, output terminal 14 will be connected to the appropriate terminal auxiliary power generating apparatus 60 through conductor 74, movable contact 41, stationary contact 43 and conductor 61.

At such time as the primary source of electrical energy is restored to conductors 63, 66 and 67, motor drive 31 will be energized from conductor 69 connected to terminal 11 to cause a reversal of the contacts shown in the respective switching devices 46 and 28 to restore the apparatus to its initial condition of operation for energization from the primary source of electrical energy.

Simultaneously, restoration of a potential across input terminals 55 and 56 on sensing means 54 will serve to cause a de-energization of auxiliary power generating apparatus 60 until such time as an interruption or failure occurs in connection with the primary source of power for the illustrative embodiment of FIG. 4 of the drawings.

Having now described the construction of the illustrative embodiment of our invention, it is believed that those skilled in the art will readily understand its operation under the various loads that may be attained in accordance with the conditions encountered. In a similar manner, it may readily be appreciated by those skilled in the art that other conditions may be encountered, as dictated by any particular environmental situation which may be adequately solved by applying the principles of our invention.

We claim:

1. In apparatus of the class above described, the combination comprising:

a source of primary electric power; power distribution means including input terminals connected to said primary source of electrical power, and output terminals adapted to be connected to load means said terminals being disposed upon a receptacle; a source of secondary electrical power; housing means including input and output terminals adapted to removably, conductively engage like corresponding terminals on the receptacle in said power distribution means, said housing means including a further receptacle having like, corresponding input and output terminals adapted to removably receive current conductive means, including power measuring means, intermediate said input and output terminals on said further receptacle, further input terminals connected to said source of secondary electrical power and current controlling means operable to alternately connect the output terminals on said housing means to the output terminals on the further receptacle or said further input terminals.

2. The apparatus of claim 1 in which the input terminals on the housing means and the input terminals on the receptacle thereon, and output terminals on the housing means and the output terminals thereon, are in like coaxial alignment.

3. The apparatus of claim 1 in which the current controlling means in the housing means includes an actuator therefor, extending through said housing.

4. The apparatus of claim two in which the housing means is radially elongated.

5. The apparatus of claim four in which the current controlling means is disposed radially outwardly from the coaxially disposed terminals.

6. The apparatus of claim four in which the further terminals on said housing are disposed in the radially elongated portion thereof.

7. The apparatus of claim six in which the current controlling means includes an actuator extending through the housing, said actuator being rotatable about an axis parallel to the axes of the input and output terminals.

8. The apparatus of claim two in which the current controlling means includes a motor means.

9. The apparatus of claim eight in which means responsive to the presence of electrical potential on the input terminals of the power distribution means or the further input terminals on the housing is operably connected to the motor means on the current controlling means.

10. The apparatus of claim nine in which the means responsive to the presence of electrical potential is operative to energize the motor means on the current controlling means so that the output terminals on the further receptacle on the housing means are connected to the input terminals of said further receptacle whenever the input terminals on the power distribution means are energized.

* * * * *